United States Patent [19]
Berthiez

[11] 4,060,021
[45] Nov. 29, 1977

[54] CIRCULAR INDEXING PLATE FOR A MACHINE TOOL

[75] Inventor: Charles William Berthiez, Lausanne, Switzerland

[73] Assignee: Charles William Berthiez, Lausanne, Switzerland

[21] Appl. No.: 531,878

[22] Filed: Dec. 12, 1974

[30] Foreign Application Priority Data

Dec. 12, 1973 France .................................. 73.44419

[51] Int. Cl.² .......................... B23D 7/08; B23Q 3/10
[52] U.S. Cl. .................................. 90/58 B; 51/240 T; 90/DIG. 28; 408/234
[58] Field of Search .................. 90/56 R, 58 R, 58 D, 90/58 C, DIG. 28; 51/240 R, 240 T; 408/234; 248/188.2, 396; 108/4, 7, 147; 254/86 R

[56] References Cited

U.S. PATENT DOCUMENTS

| | | | |
|---|---|---|---|
| 3,523,698 | 8/1970 | Bishop | 254/86 R X |
| 3,592,102 | 7/1971 | Berthiez | 90/56 R |
| 3,762,275 | 10/1973 | Imamura | 90/58 C |
| 3,807,034 | 4/1974 | Pevzner et al. | 90/58 R X |

*Primary Examiner*—Othell M. Simpson
*Assistant Examiner*—Z. R. Bilinsky
*Attorney, Agent, or Firm*—Fitzpatrick, Cella, Harper & Scinto

[57] ABSTRACT

The present invention relates to a machine-tool having a circular indexing plate, provided at its periphery with jacks adjustable in height, abutting on the foundation of the plate.

The stroke of the jacks in the direction of the support surfaces may exceed the horizontal position of the plate without load.

The invention is applicable to machine-tools.

9 Claims, 6 Drawing Figures

CIRCULAR INDEXING PLATE FOR A MACHINE TOOL

The present relates to circular indexing plates for machine tools having formed the subject matter of U.S. Pat. No. 3,592,102 issued July 13, 1971 and in which jacks, which are adjustable in height and disposed on the periphery of the plate, make it possible to limit the effects of swing of the plate whilst so-called unbalanced pieces, whose centre of gravity is offset with respect to the axis of the plate, are placed in position.

In the device used according to the main above-mentioned Patent, the stroke of the jacks is preferably limited in height by an abutment on the plate corresponding to the support of the plate with no load when its upper surface is horizontal.

In this way, complementary supports are obtained which are used in combination with the circular slide of the plate and which make it possible to eliminate the greater part of the effects of swing of the plate produced by the unbalanced pieces.

Experience has shown that this arrangement enables a sufficient accuracy to be obtained in the majority of cases.

However, this arrangement does not enable an absolute horizontality of the plate to be obtained, since the jacks are subjected to unequal stresses which bring about bending caused by compression which itself is unequal, either on the jack proper or on its support surfaces, integral with the foundation of the plate.

Obviously, in this case, the differences are very small, of the order of one hundredth of a millimeter, but nevertheless, with the increased demands for accuracy and precision in the domain of mechanical construction, these values are sometimes considered by the users as not being satisfactory.

With the device according to the afore-mentioned Patent, this drawback was remedied by adjusting the abutment as required in each particular case, but this process required time for adjusting each unbalanced piece.

In the improved embodiment of the present invention, the absolute horizontality of the plate is obtained directly by acting on the jacks and without using abutments which necessitate a particular adjustment.

In accordance with the present concept, the stroke of the jacks in the direction of the support surfaces may exceed the horizontal position of the plate without load.

This arrangement makes it possible to compensate for the unequal stresses mentioned above and thus to obtain a position of absolute horizontality of the plate.

Each jack is actuated by a conventional speed reduction group comprising an electromagnetic brake on the motor. The jacks are controlled by a portable push-button control which makes it possible to obtain the rise or descent of the plate, continuously or intermittently.

The use of the brake and of a very considerable reduction of the transmission between motor and jack enables very low values to be obtained, of the order of one hundredth of a millimeter.

Electrical contacts controlling the stopping of each jack motor enable three particular positions in height of said jack to be obtained. A first low end-of-stroke contact ensures the adjustment of the support face of the jack at a short distance from the corresponding face of the bottom of the plate.

This position is automatically obtained when the plate is put into operation which, consequently, may rotate freely.

A second contact defines the position in height of the jack placed in abutment beneath the table without load. This position is automatically obtained when the plate stops.

A third safety contact defines the maximum position in height of the jack which is located at a short distance above the preceding position so as to permit all the necessary adjustments without creating a dangerous rising of the plate, which might happen in the case of an erroneous manoeuvre of the plate without load.

The horizontality of the plate is controlled by means of horizontality control members such as spirit levels or mercury levels which are fixed to the plate. These horizontality control members are regulated at O for the position of the jacks supported beneath the plate, without load, the surface of the plate itself being horizontal at O.

The application of an unbalanced load naturally acts on the levels, indicating that the surface of the plate is no longer in its initial position and, to return it, one acts successively on each of the jacks so as to return the levels of their position O.

This operation is repeated by the operator for each indexed position of the plate.

According to another simplified embodiment which is somewhat different from the teaching of Patent No. 3,592,102, and based on the same process, the jacks are disposed between the lower face of the plate and the ball races integral with the bed which transmits the reactions obtained to the foundation of the plate.

The invention will be more readily understood on reading the following description with reference to the accompanying drawings, in which.

Figure 1:
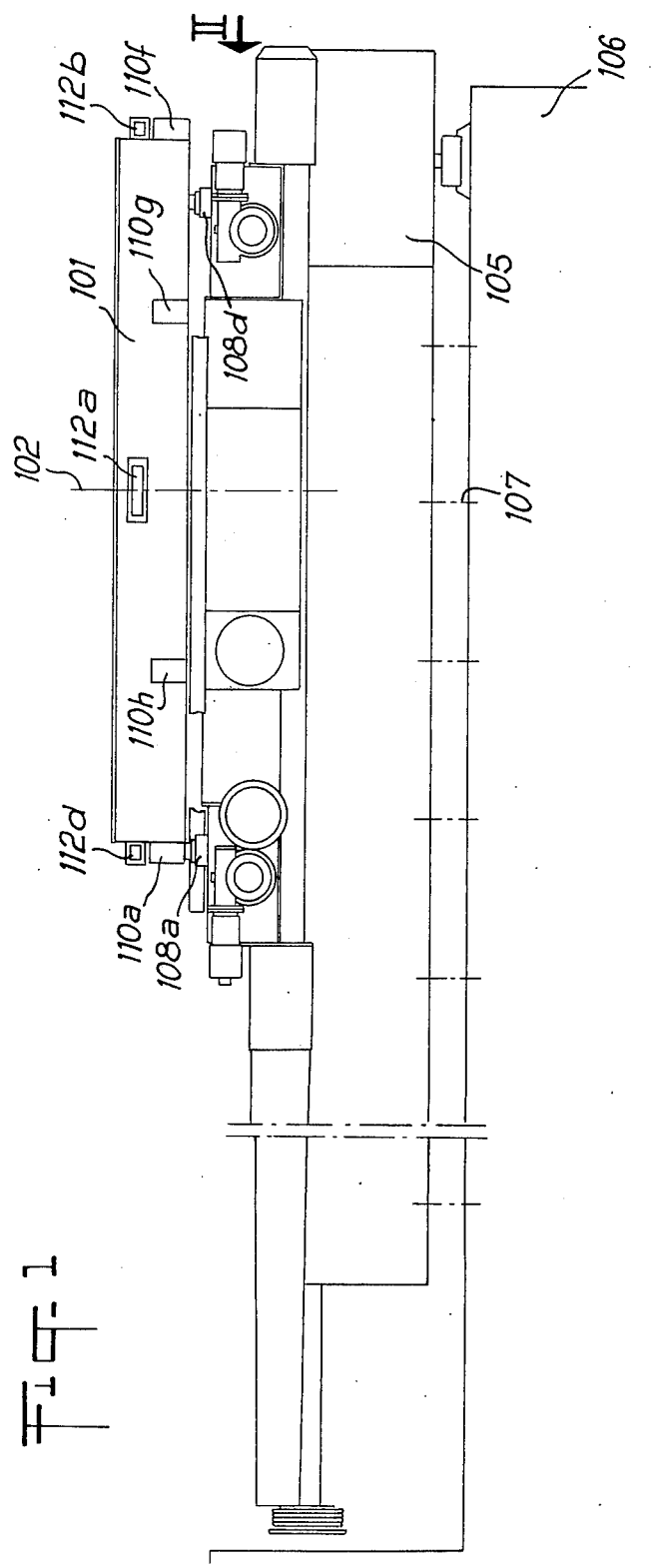
FIG. 1 is an elevational view of the plate.
Figure 2:
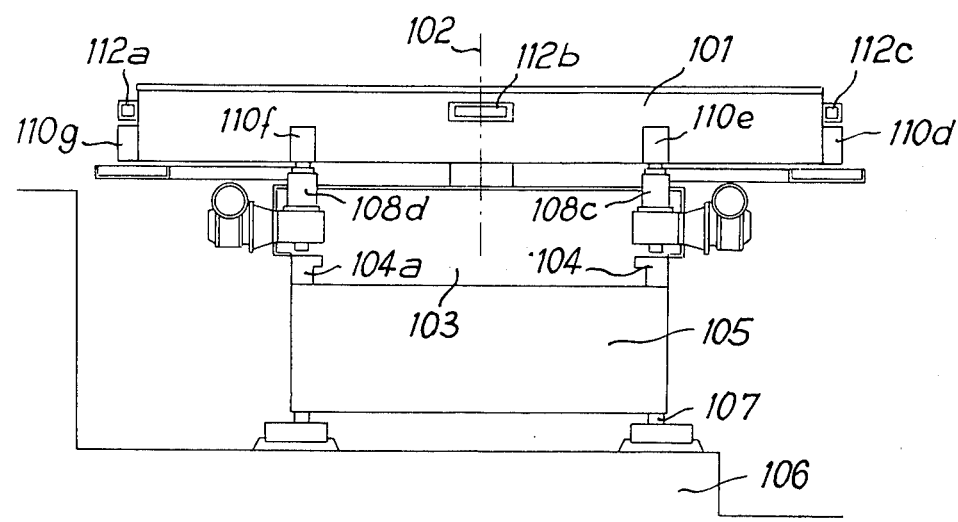
FIG. 2 is a side view in the direction of arrow II of FIG. 1.
Figure 3:
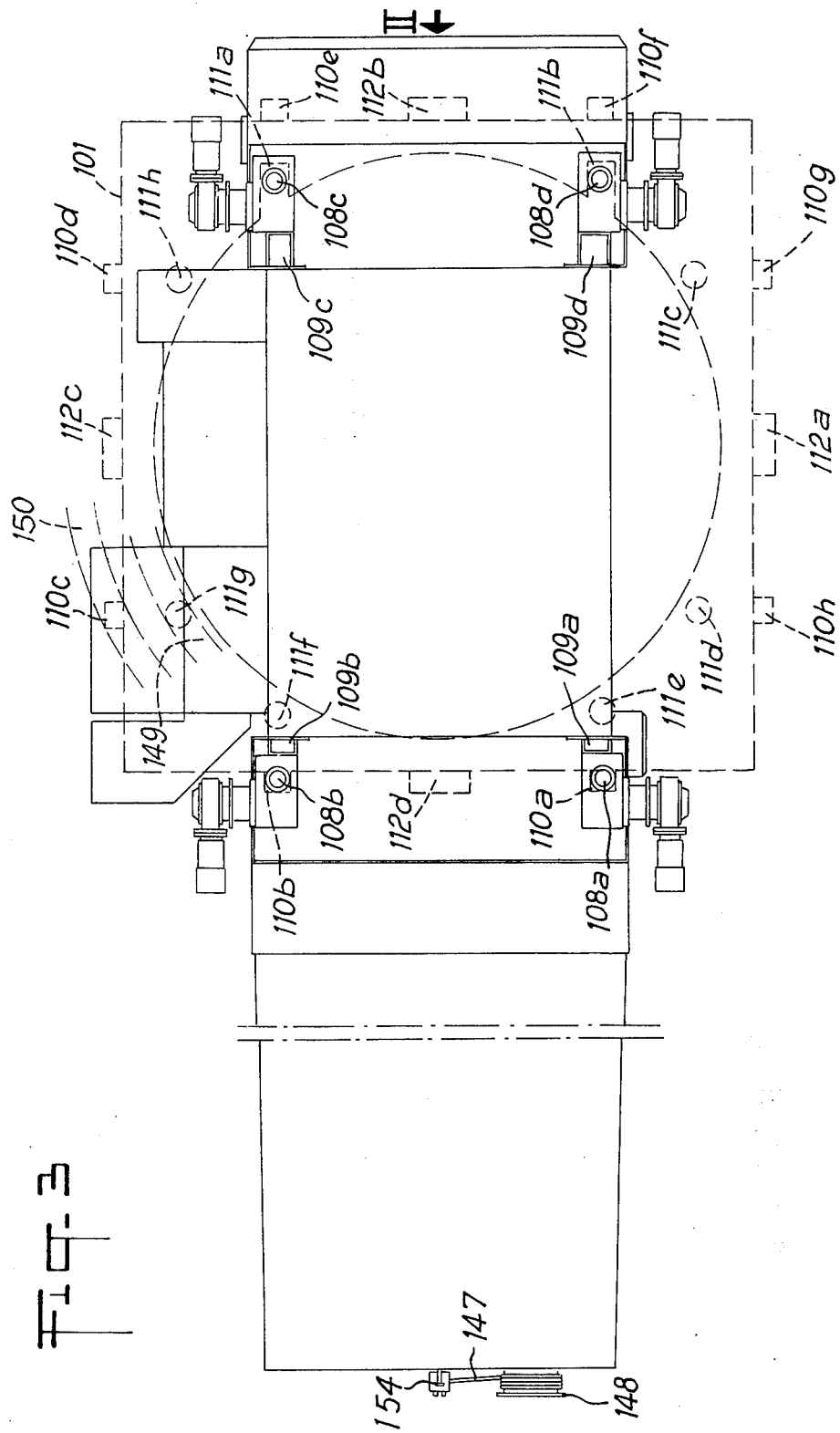
FIG. 3 is a plan view on which the plate is shown in broken lines.

Referring now to the drawings, FIGS. 1 to 3 show a circular indexing plate for machine tools, of the type forming the subject matter of the afore-mentioned Patent.

The plate 101 on which are disposed the workpieces is mounted to rotate about its axis 102 on a support 103 mounted to slide by means of slides 104, 104a on a bed 105 which is in abutment on the foundation 106 by means of jacks 107.

On the member 103 supporting the plate are mounted, in known manner, by means of cross-pieces 109a to 109d, jacks 108a, 108b, 108c, 108d, against which the plate 101 may abut by means of four studs 110a 110b and 11a and 111b. The distance from jacks 108a, 108b to the centre of the plate being different from that of the jacks 108c 108d, results in the distance of the studs also being different and that therefor it is necessary to provide two series of eight studs 110a to 110h and 111a to 111h so as to obtain the supports corresponding to four positions of the plate at 90°.

On the four lateral faces of the plate 101 and in their median part are fixed members 112a to 112d for controlling the horizontality of the plate, which are constituted in particular by spirit levels. These levels are adjusted at O for the position of the jacks in abutment beneath the plate 101, without load, the surface of the plate itself being horizontal at 0.

The application of an unbalanced load on the plate naturally acts on the horizontality control members 112a to 112d indicating that the surface of the plate is no longer in its initial position and that, to return it thereto, one must act successively on each of the jacks so as to return the levels to their position O.

This operation is repeated by the operator for each indexed position of the plate.

Figure 4:
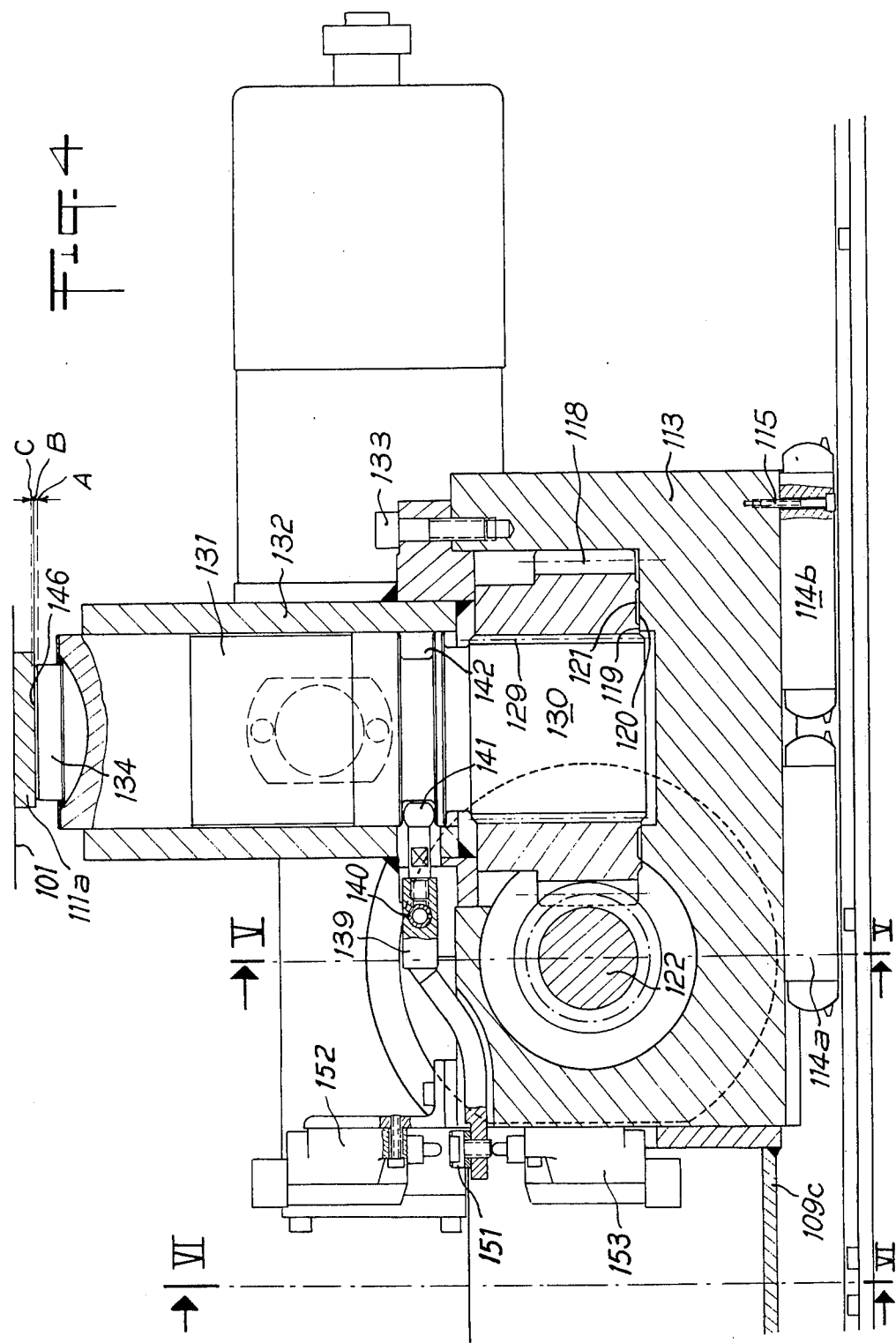
FIG. 4 is an elevational sectional view of a jack and of its drive member.
Figure 5:
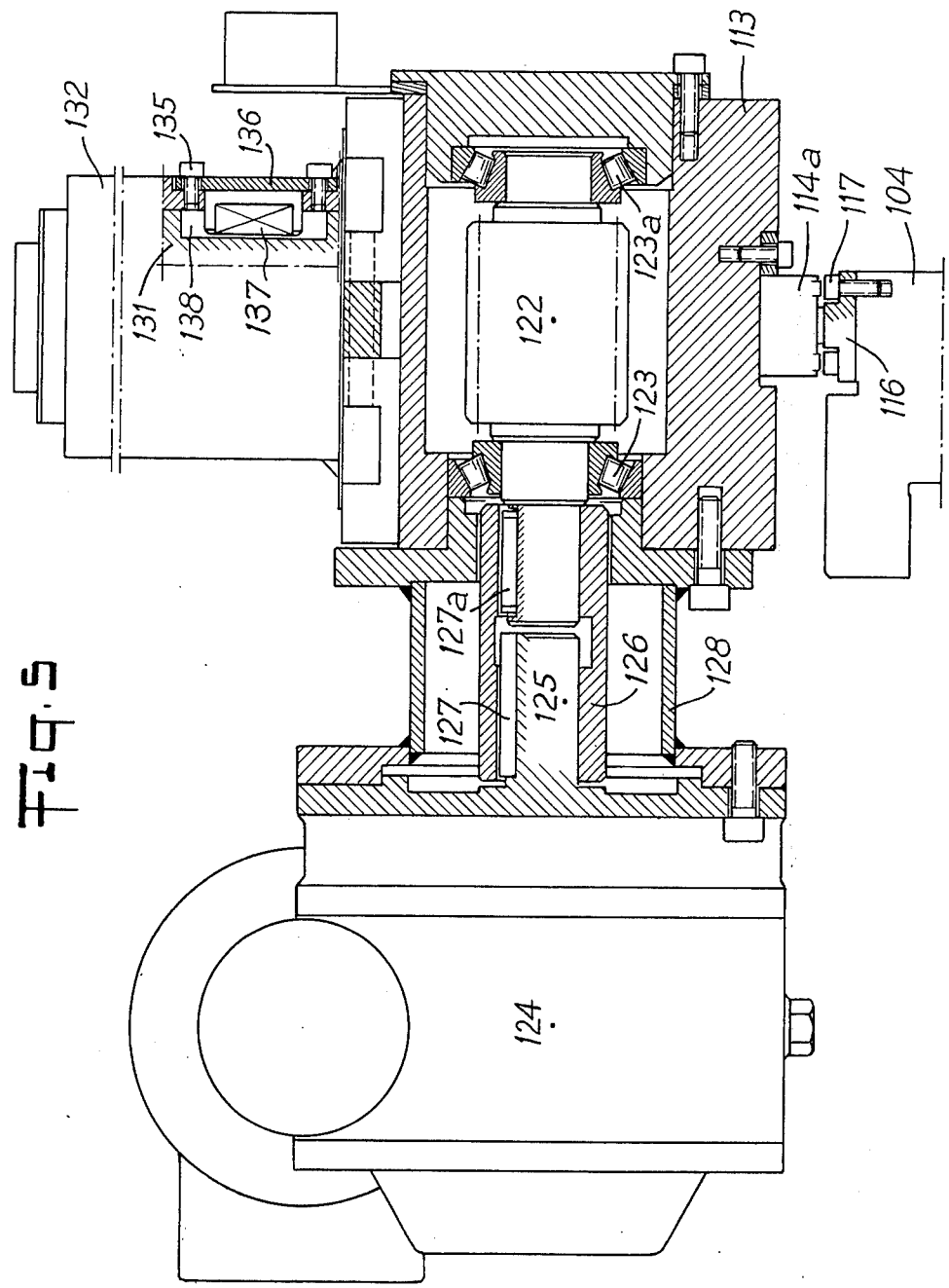
FIG. 5 is an elevational sectional view along line V—V of FIG. 4.
Figure 6:
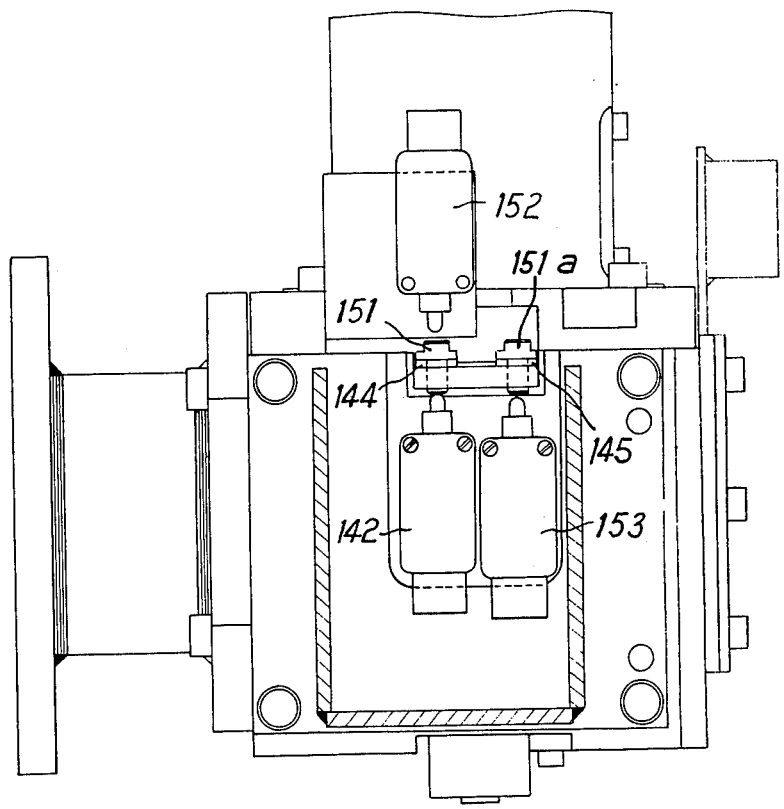
FIG. 6 is an elevational view of the jack along the line VI—VI of FIG. 4.

FIGS. 4, 5 and 6 show in detail the jack 108c which comprises a body 113 provided with two shoes with cylindrical rollers 114a, 114b fixed by screws 115 and which roll on a rail 116 fixed by screws 117 on the slide 104 guiding the support 103 and which is fixed to the bed 105.

In the body 113 is rotatably mounted a helical gear 118 whose face 119 is in contact with the corresponding face 120 of the body 113 and which presents grease channels 121 avoiding gripping of said faces.

The helical gear 118 meshes with a worm gear 122 which is mounted in the body by means of tapered roller bearings 123, 123a and which is rotated by a speed reduction group 124 whose shaft 125 is connected to the worm gearm 122 by a sleeve 126 and pins 127, 127a.

The speed reduction group 124 is fixed to the body 113 by a cross-piece 128.

The helical gear 118 has a tapped part 129 forming a nut in which is engaged a corresponding threaded part 130 of a jack rod 131 which is centred in a guide 132 fixed by a flange by means of screws 133 to the body 113.

The supporting end of the rod 131 is machined spherically so as to receive the stud 134 which is in contact with the plate 101 by means of a stud 111a.

The support reaction of the plate 101 is transmitted to the jack rod 131 and to the helical gear 118 whose face 119 is in contact with the face 120 of the body.

On the guide 132 (FIG. 5) is fixed, by means of screws 135, a flanged pin 136 whose flat part 137 is engaged in a corresponding groove 138 provided on the jack rod 131, so as to prevent said rod from rotating and from thus converting the movement of rotation of the wheel 118 into a movement of translation of the rod.

FIGS. 4 and 6 show a means of controlling the stroke of the jack which comprises a lever 139 mounted to pivot about an axis 140 integral with the guide 132 and which presents at one of its ends a swivel joint 141 which is engaged in a channel 142 of the jack rod 131, said lever thus being driven by rod 131 when it is displaced in height.

The weak stroke of the rod 131 is strongly amplified by the relations of the arms of the lever 139, so as to increase the precision of the positioning of the jack rod in height.

At its other end, the lever 139 is provided with screws 151, 151z which cooperate with contacts 152, 142 and 153.

The contact 152 controls the low end-of-stroke of the rod 131 of the jack whilst the contact 142 controls the position of support of the plate without load and whilst the contact 153 controls the high end-of-stroke of the rod 131.

Shims 144, 145 disposed under the screws 151 and 151z make it possible to obtain very precise stops, particularly for the position of support of the plate without load.

The contact 152 makes it possible to dispose the support face 146 of the rod 131 of the jack in a position A at a short distance below the plate 101 (FIG. 4).

This position is obtained automatically when the plate 101 is put into operation, which plate may consequently rotate freely about its axis 102.

The contact 142 defines the position in height B of the jack placed in abutment beneath the plate under load. This position is obtained automatically when the plate stops.

The so-called safety contact 153 defines the maximum position in height C of the jack which is located above the preceding position B so as to permit all necessary adjustments without creating a dangerous lifting of the plate 101 which might occur is an erroneous manoeuvre is made on the plate without load.

The speed reduction groups 124 are controlled by a portable push-button contact 154 (FIG. 3) which is connected to the device by a conductive cable 147 wound normally around a drum 148 placed at the end of the bed. The length of the cable is provided so as to permit the operator to approach any one of the horizontality control members 112a to 112c.

These horizontality control levels may be constituted by any known means and particularly by mercury levels comprising an electrical contact of conventional type which automatically stops the manoeuvring of the jacks as soon as the horizontal position of the plate is obtained.

According to another embodiment of the device according to the invention, it would be possible to provide only two jacks placed in the axis of displacement of the plate and correcting only the unbalances placed along this same axis.

Similarly, the sixteen studs 110 and 111 on which the jacks abut could be reduced to eight, if the distances of the jacks were symmetrical with respect to the axis of the plate.

These studs could be multiplied on the same radius in order to allow support in the different positions more numerous than the four positions at 90°.

To obtain any number of positions of the plate, it would be possible to replace the two series of studs 110 and 111 by two continuous circular strips 149 and 150 shown in broken lines in FIG. 3.

Although speed reduction groups for driving the jacks have been shown and described, it is obvious that any other drive member could be used, such as hydraulic motor or variable speed d.c. electric motor.

What I claim is:

1. In a machine tool having a circular indexing plate adapted to support a load, said plate being formed with an upper and lower face, means mounting said plate for rotation about a vertical axis, a plurality of jacks disposed along the periphery of said plate and bearing against portions thereof to support said plate, each of said jacks including a body portion and a movable portion, said movable portion being adjustable vertically, at least between at low end of stroke and a high end of stroke, the stroke of each so disposed jack movable portion in the direction of said plate being capable of exceeding the horizontal position of said plate without load each of said jacks including control means for determining the vertical position of each said movable portion including at least two sets of contacts mounted on each of said jacks, one of said sets being arranged to provide control contact at the level position of said plate without load and the other set being arranged to provide control contact at the high end-of-stroke of said jack movable portion and means mounted on each said jacks responsive to the movement of the movable portion with respect to said body to actuate one of said contact sets.

2. Apparatus according to claim 1, wherein each said movable member comprises a vertical displaceable rod actuated by drive members.

3. Apparatus according to claim 2, wherein said drive members include a screw provided on each said jack for actuating each said rod and said movement responsive means includes a lever articulated to each said rod of the jack, of which lever one end cooperates with a low end-of-stroke contact of the jack, the contact controlling the position of support of the plate without load and the high end-of-stroke contact of the screw of the jack, said contacts being fixed to the body of the jack.

4. Apparatus according to claim 3, wherein the jacks are disposed beneath the lower face of the plate and the body of said jacks is integral with the member supporting the plate and wherein the body of the jack rests, via rolling members, on support surfaces constituted by rails fixed to the bed.

5. Apparatus according to claim 2, wherein the jacks are disposed beneath the lower face of the plate and the body of said jacks is integral with the member supporting the plate and wherein the body of the jack rests, via rolling members, on support surfaces constituted by rails fixed to the bed.

6. Apparatus according to claim 1, wherein the vertical axes of the jacks are dissymmetrical in two's with respect to the vertical axis of the plate which bears two series of studs against which the jacks may abut.

7. Apparatus according to claim 6, wherein the jacks are disposed beneath the lower face of the plate and the body of said jacks is integral with the member supporting the plate and wherein the body of the jack rests, via rolling members, on support surfaces constituted by rails fixed to the bed.

8. Apparatus according to claim 1, wherein the jacks are disposed beneath the lower face of the plate and the body of said jacks is integral with the member supporting the plate and wherein the body of the jack rests, via rolling members, on support surfaces constituted by rails fixed to the bed.

9. Apparatus according to claim 1, wherein liquid levels are fixed to said plate.

* * * * *